Dec. 29, 1959 J. V. KIERULFF 2,919,042
TRAVELLING SHIP-LOADING CRANE
Filed Oct. 8, 1956 3 Sheets-Sheet 1
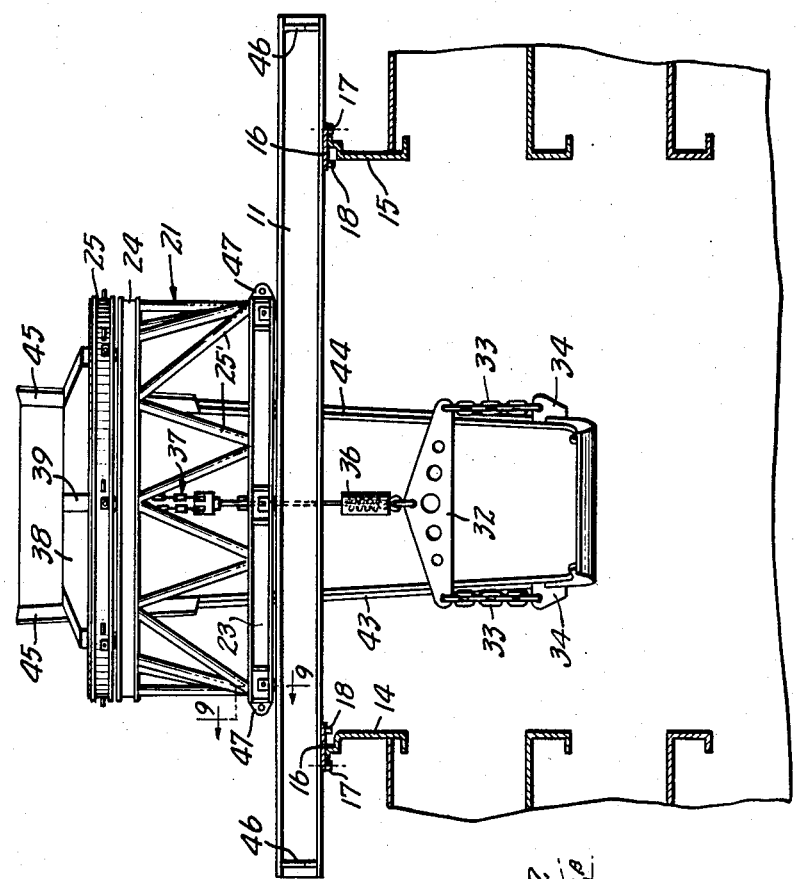
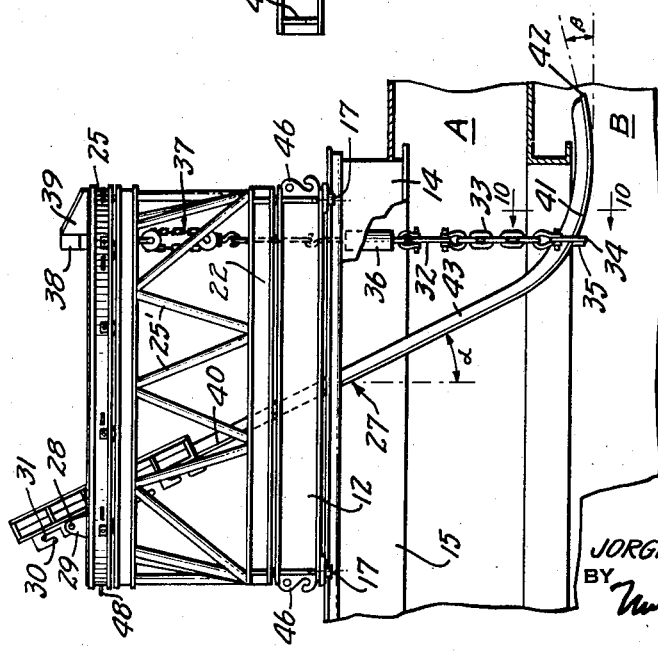
INVENTOR
JORGEN V. KIERULFF
BY
ATTORNEYS Dec. 29, 1959  J. V. KIERULFF  2,919,042
TRAVELLING SHIP-LOADING CRANE
Filed Oct. 8, 1956  3 Sheets-Sheet 2

INVENTOR
JORGEN V. KIERULFF
BY
Mitchell & Bechert
ATTORNEYS

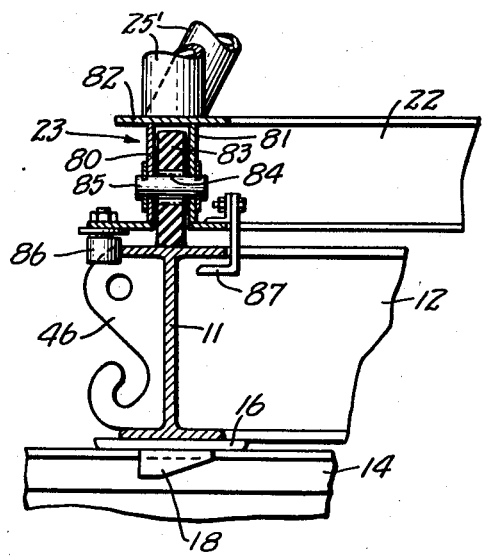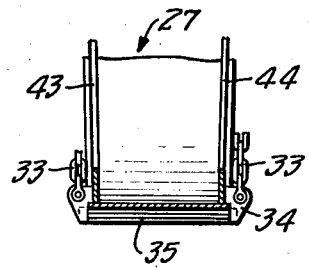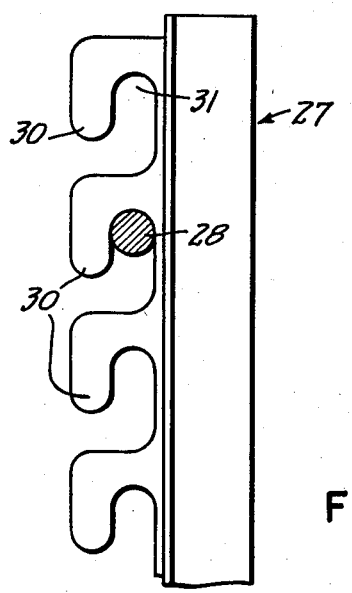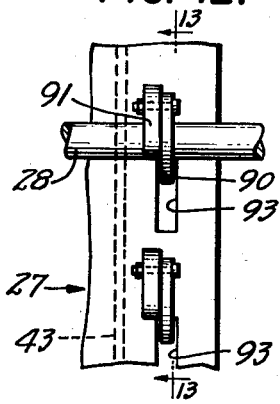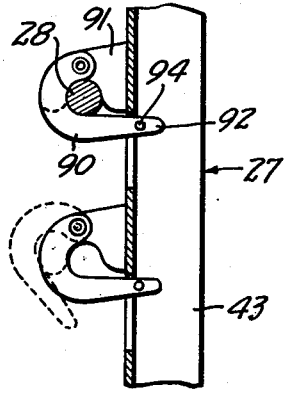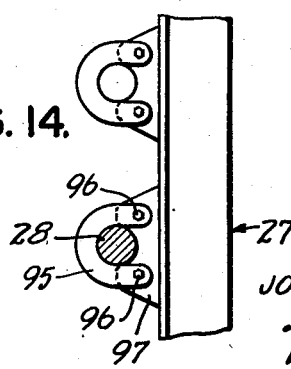

United States Patent Office 2,919,042
Patented Dec. 29, 1959

2,919,042

TRAVELLING SHIP-LOADING CRANE

Jorgen V. Kierulff, Bellflower, Calif.

Application October 8, 1956, Serial No. 614,419

3 Claims. (Cl. 214—15)

My invention relates to a ship-loading device, and in particular to a device for loading scrap metal in the hold of a ship.

The process of loading scrap metal, such as scrap iron or steel, into the hull of a ship has long been a cumbersome operation. Most often, manual labor is used in order to effect efficient stowage of the scrap. Another method involves the use of a crane or derrick to load the steel into the hull, and the subsequent use of a bulldozer or other equipment to distribute the scrap over a given deck level. This latter method entails frequent breakdowns of the bulldozer, and maintenance is an expensive factor. Other methods and systems in use employ a chute suspended from the hatch coaming or positioned by the ship's rigging gear, the loading being accomplished by means of tilt skips or by carrying the scrap to the chute by means of electric magnets. Regardless of which of the above methods is used, loading is a very time-consuming and expensive process, and often the mooring time required to effect loading becomes the most expensive item in the ultimate cost of the scrap at its destination.

It is, accordingly, an object of the invention to provide an improved loading device particularly for use in loading scrap metal in a ship.

It is another object to provide an improved ship-loading device wherein substantial economies in time required to load an entire ship may be realized.

It is a further object to meet the above objects with a device inherently capable of direct efficient stowage of scrap metal in distant recesses of the ship and therefore requiring no further means of distribution.

A still further object is to provide means effecting more densely compacted loading of scrap metal and therefore more efficient payloading of a vessel.

It is a general object to achieve the above objects with a rugged, simple, non-fouling structure which may be flexibly adapted to standard hatch coamings and which may involve a minimum use of labor and substantially increased rate of loading, beyond anything heretofore achieved.

Other objects and various further features of novelty and invention will be pointed out or will occur to those skilled in the art from a reading of the following specification in conjunction with the accompanying drawings. In said drawings, which show for illustrative purposes only, preferred forms of the invention:

Fig. 1 is a side view in elevation of a crane of my invention, shown mounted on a hatch coaming, with certain deck levels sectioned to illustrate the manner of loading;

Fig. 2 is a front view of the crane of Fig. 1;

Figure 3:
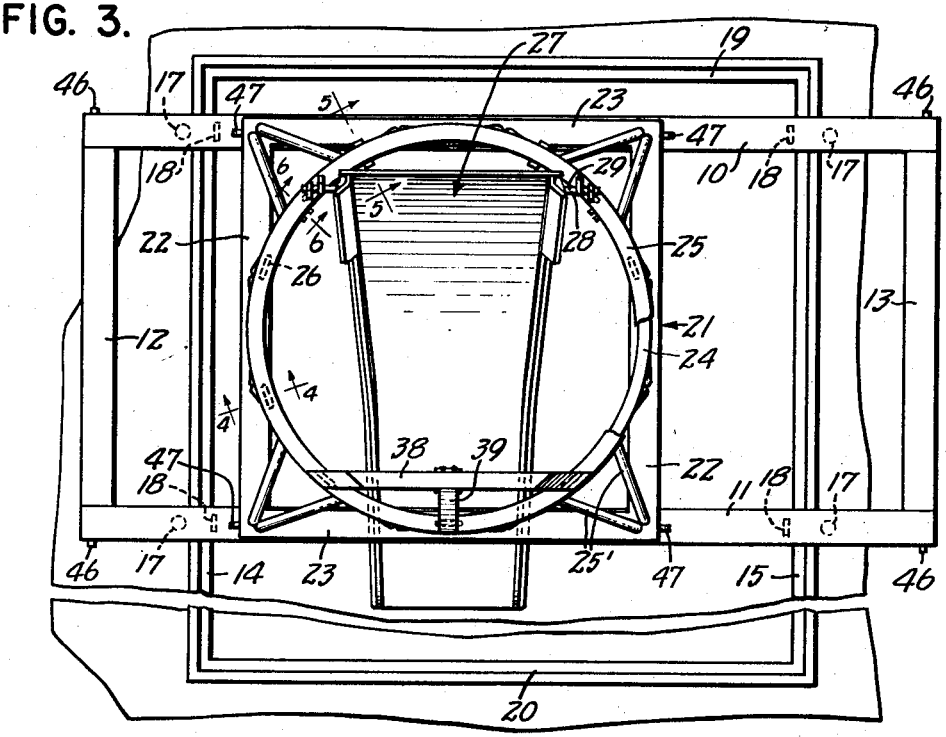
Fig. 3 is a plan view of the crane of Figs. 1 and 2.
Figure 4:
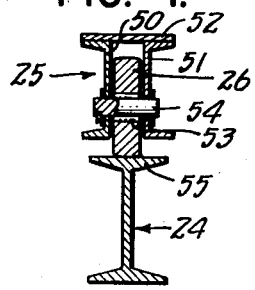
Figure 5:
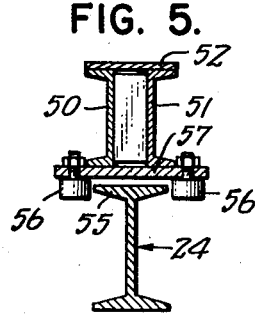
Figure 6:
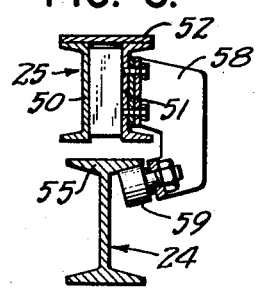
Figure 7:
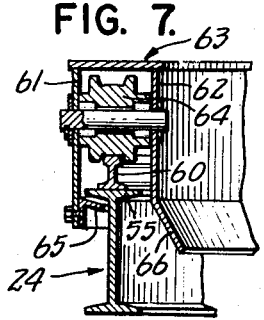
Figure 8:
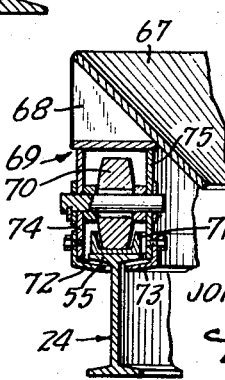

Figs. 4, 5 and 6 are enlarged sectional views in the planes 4—4, 5—5 and 6—6 of Fig. 3;

Figs. 7 and 8 are enlarged sectional views similar to Fig. 4, but illustrating two slight modifications;

Fig. 9 is an enlarged fragmentary sectional view taken in the plane 9—9 of Fig. 2;

Fig. 10 is a fragmentary sectional view taken in the plane 10—10 of Fig. 1;

Fig. 11 is an enlarged fragmentary side view of the upper end of the chute of Fig. 1;

Figs. 12 and 13 are enlarged fragmentary elevation and side views, respectively, of a modified structure, representing an alternative for that of Fig. 11, the view of Fig. 13 being taken substantially in the plane 13—13 of Fig. 12; and Fig. 14 is a view similar to Fig. 13 to illustrate a further modification.

Briefly stated, my invention contemplates an improved ship-loading device comprising a rectangular frame supported on opposite sides of a hatch coaming and guided for longitudinal movement along the walls of the coaming. A trolley is mounted for transverse movement along the beams of the rectangular frame. The trolley comprises a rigid centrally open structure for supporting a circular track in an elevated position, the elevation being of the order of the deck-to-deck spacing of a ship. The upper end of the trolley comprises an open circular track for rotatably guiding a ring-shaped turntable. A large wide chute is adjustably supported on one side of the turntable and extends within the open space of the trolley for discharge into the hold. The chute is characterized by an initial substantially straight portion tangentially joining a curved lower end, capable of discharging a load substantially horizontally and preferably with a slight upward elevation, thereby making possible discharge of scrap metal with substantial momentum, laterally of the loading device.

Referring to Figs. 1, 2, and 3 of the drawings, my invention is shown in application to a crane comprising a rigid rectangular frame or bridge having spaced elongated beams 10—11 connected at their ends by spacer beams or members 12—13. The length of the beams 10—11 is preferably such as to rest upon and preferably extend beyond spaced side walls 14—15 of the hatch coaming of a ship. While rollers may be employed to guide and support the beams 10—11 on the coaming walls 14—15, I show provision of slide wear pads 16 on the underside of the beams 10—11. Pads 16 may ride the flange of the hatch coaming, and guide rollers 17 carried by the beams 10—11 may engage the outer sides of the hatch coaming to retain or laterally locate the framework or bridge 10—11. Abutment means or stop cleats 18 may also be carried by the underside of the beams 10—11, to serve as limit stops for longitudinal adjustment of the bridge frame 10—11. Cleats 18 will be understood to engage one or the other of the coaming walls 19—20 at such limits of adjustment of the bridge.

Adjustably mounted along the beams 10—11 of the bridge is a trolley or carriage 21 having a square base comprised of beams 22—23 and a circular superstructure or track 24. The track 24 may conveniently be an I-beam with circular upper and lower flanges, as will later more clearly appear. The circular frame or track 24 is rigidly spaced substantially above the square frame 22—23, and in the form shown, transitional columns or trusses 25' are welded to the upper and lower frame of the trolley to define a rigid and thoroughly braced structure. The circular framework or track 24 preferably is of a diameter substantially matching the span between sides of the base 22—23 and between beams 10—11, so that within the circular track 24 the entire space may be open for free and unfettered reception of products discharged in this opening.

Mounted upon the circular track 24 is a ring-shaped turntable 25 including means, such as rollers 26, for guided rotary motion on the track. A discharge chute or trough 27 is adjustably supported on the turntable 25 and extends downwardly through the inner volume of the trolley 21 and between the beams 10—11, for discharge substantially below the bridge structure. In the form shown, the upper end of the chute 27 is adjustably supported on a pivot bar 28 spanning a small chord on one side of the turntable 25 and shown in Fig. 3 to be secured at both ends in suitable supporting brackets 29. To engage the bar 28, the lower side of the upper end of the chute 27 is formed with a pair of laterally spaced members defining a series of spaced hook-shaped lugs 30, the hook openings 31 facing downwardly and being somewhat longitudinally extensive (i.e. in the direction along the straight part of the chute 27) so that the bar 28 may be deeply received therein, as shown clearly in Fig. 11, all for a purpose which will be made clear.

The lower end of the chute 27 is preferably suspended by a differential mechanism, such as a strong-back, whiffletree or beam 32, the spaced ends of which are shown connected by chains 33 to suitable lugs 34 welded to the sides of the chute 27 and to a reinforcing back-plate 35; lugs 34 are preferably spaced or offset laterally of the chute walls 44 so that chains 33 may be substantially offset from walls 44, thereby materially reducing the chances of scrap fouling chains 33. The beam 32 is itself centrally supported by suspension means including a snubber 36, which may be a spring or dashpot or a combination of the same, and an adjustable hoist mechanism 37 carried by the turntable 25 at a location substantially diametrically opposed to the bar 28. In the form shown, a suspension beam 38 and cross-beam 39 provide rugged support for the hoist mechanism 37.

The chute 27 is shown to comprise an upper substantially straight portion 40 and a lower generally arcuate portion 41, preferably tangent to the straight portion 40. The radius of curvature of the lower end 41 is preferably such as to define substantially a 100° included angle between the straight portion 27 and the discharge end 42. Ordinarily, I prefer that the chute have a straight portion 40 of length substantially three times the radius of the curved portion 41, in which case the angle $\alpha$ representing the inclination of the straight portion 40 with respect to the vertical, is of the order of 20 to 30 degrees, preferably 25 degrees; the lower end 42 is preferably elevated above the horizontal, as at an angle $\beta$ of from 10 to 20 degrees, preferably 15 degrees.

To complete the description of the chute, it is shown to include spaced side walls 43—44 and to be of a width which converges in the downward direction. Thus, the upper end defines a wide mouth, which may be even further widened by the addition of extended scoop-plates 45, to receive discharged material with minimum probability of loss; with plates 45 and the converging walls 43—44, chute 27 may effectively focus the discharged material for directional loading in the hold of the ship. Preferably, if an electric magnet is used for loading my crane, I prefer that the span between scoop plates 45 shall substantially exceed the effective diameter of the loading magnet.

In use, ship's winches and other gear may readily position the entire crane (including the bridge, trolley, and chute as a unit) on a desired hatch coaming. For this purpose, combination lift and drag lugs 46 are provided at the corners of the bridge structure 10—11—12—13. Once positioned on the coaming, these same lugs may serve as a means whereby the entire structure may be dragged, positioned, and anchored as desired along the coaming walls 14—15. Drag lugs 47 at the base of the trolley 21 serve for ready positioning and anchoring of the trolley along the beams 10—11, and suitable lugs or cleats 48 on the turntable 25 facilitate rotary positioning of the turntable and chute 27. The ship's winches and rigging are also used to locate the chute 27 in a desired elevation notch 31 on the support bar 28, so as to permit the above expressed preferred angular relationships to be established and at the same time to permit selection of a desired discharge elevation for the end 42, as, for example, to discharge into the A-deck space or into the B-deck space shown in Fig. 1.

It has been noted above that the elongated beams 10—11 (constituting the track for trolley 21) preferably project substantially beyond the coaming side walls 14—15 (i.e. beyond the slide or wear pads 16); the extent of such overhanging projection is such that the respective outer ends 47 of the trolley base 23 may ride beyond the coaming side walls to permit full flexibility in maneuvering chute 27 throughout the full span between the coaming walls 14—15. Stated in other words, this track overhang, as illustrated in Figs. 2 and 3, means that chute maneuverability is limited only by the chute sides 43—44, in contact with the coaming side walls, thus permitting maximum loading access to recesses in the ship's hold.

A load of scrap steel, iron or the like will ordinarily be dropped over the mouth of the chute 27 and generally centrally of the turntable 25. The steep slope of the straight portion 40 will afford opportunity for the dropped scrap to develop substantially and uniform momentum prior to reaching the curved end 41. This momentum is substantially unimpaired by the gentle curvature of the portion 41, so that very substantial lateral momentum exists in the discharged products thrown laterally into the hold. For the preferred angle $\beta$ of discharge, these products are thrown upwardly and with a trajectory that may extend to the furthest sides of the hold. Furthermore, the momentum of discharge is such as to effect substantial compacting of the product, so that efficient loading results.

Since the use of my chute involves a substantial change in direction for any material discharged at the lower end 42, the structure as a whole must be able to reactively sustain the resulting recoil or shock. Preferably, this recoil or shock is accommodated by the chute 27 and its suspension, so that the main frame parts 21—25 are relatively isolated from direct shock. For the arrangement shown, the direct vertical shock component (due to changing the direction of the moving load) is sustained by the snubber 36; however, there is a further recoil reaction tending to bodily upwardly displace the entire chute 27, including particularly the upper end thereof. It is for this reason that the hook-shaped openings 31 are preferably elongated, by an amount sufficient, in the presence of the heaviest loads, to assure adequate recoil displacement of chute lugs 30 relatively to bar 28, without loss of retention of the chute by bar 28.

For ease of manipulation, and because the turntable must be rotated and the trolley must be displaced relatively frequently, I prefer to employ a roller suspension for both of these movements. The rollers 26 for the turntable have already been referred to, but they will be described in greater detail in connection with Fig. 4. In this figure, the turntable frame is shown to comprise two radially spaced oppositely facing channels 50—51, with an upper annular plate 52 connecting them. Rollers 26 are preferably mounted on roller-bearing means 53 riding a suitable shaft 54. The roller 26 may be crowned, as shown, to ride the top flange 55 of the circular track 24.

For retention of the turntable 25 against eccentric displacement on the track 24, I show in Fig. 5 the provision of pairs of inner and outer retaining rolls 56 suspended from angularly spaced cross-pieces 57 which may be welded to the bottom flanges of the turntable channels 50—51.

In Fig. 6, I show the provision of further retaining means for assuring that when a transient load is sustained by the chute 27 and turntable 25, the turntable will not be displaced off the track 24. In the form shown, such means comprises brackets as at 58, secured to the web of channel 51 and extending downwardly to support a retaining roller 59 which rides the underside of the upper track flange 55. Brackets 58 are preferably located at or near the angular locations of brackets 29, inasmuch as reaction thrusts due to transient loads are sustained principally at these locations.

Alternative suspensions for the turntable on the circular track are shown in Figs. 7 and 8. In Fig. 7, a conventional rail 60 is secured to the track-support 24 and provides the circular track. The sides 61—62 of the turntable 63 are more widely spaced to accommodate flanged rollers, as at 64, thereby obviating the need for lateral retaining rollers, as at 56 in Fig. 5. The outer side plate 61 preferably carries at its lower edge a retaining flange (or a plurality of angularly spaced lugs) 65 fitting in close clearance relation under the upper flange 55 of the circular track-support 24, thereby retaining the turntable against upward displacement off the track 60. Finally, the inner wall 62 is preferably formed at its lower edge with a sloping deflection plate or flange 66 extending radially inwardly, so that any discharged scrap which fails to strike the chute 27 and which, on the other hand, strikes the turntable, will be likely to be deflected inwardly of the open volume within the trolley 21, thereby reducing the chances of scrap fouling on the trolley.

In the arrangement of Fig. 8, a larger funnel-shaped deflector plate 67 is shown braced by gussets, as at 68, to the top of the turntable 69. Plate 67 serves to deflect scrap that might otherwise hang up on the turntable and therefore makes for more speedy and efficient use of my loading device. Fig. 8 also illustrates a slightly different roller suspension wherein the roller 70 rides a channel-shaped guide member 71 secured to the top flange 55 of the circular track-support. Retaining flanges 72—73 are carried at the lower ends of both side plates 74—75 of the turntable, and serve to retain the turntable against upward displacement off the track.

Fig. 9 illustrates preferred suspension of the trolley on the bridge beams 10—11. In such case, the sides 23 of the base frame of the trolley are shown to comprise spaced vertical plates 80—81, tied by a top plate 82 and supporting a plurality of rollers 83 therebetween. The rollers 83 are shown mounted by anti-friction bearing means 84 to shafts 85 passing through the side plates 80—81. Lateral guide rollers, as at 86, may be carried by suitable flanges or brackets at the lower end of the outer side plate 80, and an angle clip or retainer 87 may be carried by the lower end of the side plate 81 to provide a means for retaining the trolley against upward displacement of the beam 11.

In Figs. 12 and 13, I illustrate an alternative means for adjustably sustaining the upper end of the chute 27 on the support bar 28. In the form shown, separate releasable clamp members or curved links 90 are pivoted on fixed brackets 91 secured to the underside of the chute 27. Each bracket 91 is preferably of general hook-shape so as to sustain the normal weight load of the chute 27, and the clip 90 serves to removably close the downwardly facing opening in the bracket 91. The free end 92 of the clip 90 may pass through a slotted opening 93 in a laterally projecting part of the bottom of the chute 27. Thus, when the clip 90 is closed, an opening 94 in the end 92 may pass through the opening 93, so as to permit insertion of a retaining pin, for firmly holding the chute 27 in its adjusted position.

In the arrangement of Fig. 14, I show the employment of rigid U-shaped straps 95 removably securable by means of bolts 96 to brackets 97 on the underside of the chute 27. The employment of a more permanent fastening of the type shown in Fig. 14 will be appreciated as avoiding the wear that might otherwise be encountered with the use of loose clamps, as in Figs. 12 and 13, but, of course, this avoidance of wear is at a sacrifice of adjustment time whenever necessary to change the elevation of the upper point of support for the chute 27.

It will be appreciated that I have described an improved ship-loading device which is characterized by extreme ease of manipulation and by inherent high load capacity. The arrangement is such as to accommodate the maximum transient loads that can be delivered by an electric-magnet loader, as, for example, individual loads of 1500 to 4000 lbs. of scrap steel, depending upon the type of magnet and form of scrap material. The arrangement is such that once my device discharges the steel into the hold of a ship, the products are densely compacted, and no further handling by loading personnel is involved. The loading economies realized with the use of my device are so substantial that, for example, it is possible to load a standard Liberty ship with 9,600 long tons of scrap steel in six days, whereas twenty days has been the time required to load 8,900 long tons, using previous methods. Furthermore, when loaded with my device, it is possible to pack a greater weight of scrap cargo into the same ship than was possible with any other method previously employed.

While I have described the invention in detail for the preferred forms shown, it will be understood that modifications may be made within the scope of the invention as described in the claims which follow.

I claim:

1. A ship-loading crane, comprising an elongated rectangular frame including spaced beams adapted to span and to be guided for longitudinal movement along opposite walls of a hatch coaming, a trolley comprising rigidly interconnected upper and lower frames, the lower frame being open and having a span substantially equal to the spacing between said beams and guided for movement along said beams, the upper frame defining a circular track substantially spaced above said lower frame by substantially the deck-to-deck spacing of a ship, a ring-shaped turntable generally conforming to and riding upon said circular track, recoil-absorbing chute-suspension means on said turntable, and a single continuous upwardly open chute carried by said suspension means and comprising a relatively straight upper surface inclined steeply below the horizontal but less than vertical and projecting at the lower end substantially below said beams, the lower end of said chute being curved and substantially tangent to the straight portion, the curve being sufficient to discharge products at least substantially horizontally; said chute-suspension means including a bar extending chordally of said turntable and downwardly open elongated hook-shaped lugs carried by said chute near the upper end thereof, one of said lugs engaging said bar, and snubber means suspending the lower end of said chute from the side of said turntable generally diametrically opposite said bar.

2. A ship-loading crane, comprising an elongated rigid rectangular frame including spaced beams adapted to span and rest upon opposite sides of a hatch coaming, a trolley comprising an open generally square rigid frame having two opposite sides spaced in accordance with the spacing of said beams, said opposite sides being guided and supported on said beams, a circular track, truss-support means rigidly connecting angularly spaced parts of said circular track to adjacent spaced parts of said generally square frame and positioning the same above and symmetrically with respect to said generally square frame, a turntable guided for rotation and supported on said circular track and including centrally thereof chute-loading means projecting upwardly of and extending within said trolley and discharging between and below said beams, said chute-loading means comprising a single continuously upwardly open elongated downwardly inclined trough having a main body with an integral arcuate discharge end tangent thereto, the horizontal projection of said downwardly inclined trough spanning substantially the full diametrical extent of said circular track, a chute suspension bar at one side of said turntable, said trough including means for vertically adjusting the trough on said bar, and said turntable further including separate support means for the lower end of said trough, said separate support means comprising snubber means suspending the lower end of said chute from the side of said turntable generally diametrically opposite from said bar.

3. A crane according to claim 2, in which said chute-suspension bar extends chord-wise at one side of said turntable, and said separate supports means includes an equalizer beam centrally suspended from said turntable, said beam being of at least the width of said trough and suspending opposite sides of the lower end of said trough from the respective ends of said equalizer bar.

References Cited in the file of this patent

UNITED STATES PATENTS

| | | |
|---|---|---|
| 376,531 | Lentz | Jan. 17, 1888 |
| 780,521 | Olson | Jan. 24, 1905 |
| 861,141 | Olson | July 23, 1907 |
| 1,027,437 | Ridgway | May 28, 1912 |
| 1,584,442 | Every | May 11, 1926 |
| 1,617,490 | Knox | Feb. 15, 1927 |
| 1,654,719 | Clapp | Jan. 3, 1928 |
| 1,868,035 | Valstar | July 19, 1932 |
| 2,124,964 | Klyver | July 26, 1938 |
| 2,139,960 | Kauffman | Dec. 13, 1938 |
| 2,186,292 | Guhlin et al. | Jan. 9, 1940 |
| 2,216,704 | Flanagan | Oct. 1, 1940 |
| 2,513,726 | Huston | July 4, 1950 |
| 2,717,068 | Paschal | Sept. 6, 1955 |

FOREIGN PATENTS

| | | |
|---|---|---|
| 6,998 | Great Britain | Apr. 23, 1908 |
| 115,075 | Australia | Apr. 30, 1942 |
| 194,470 | Great Britain | Mar. 15, 1923 |
| 520,848 | Germany | Mar. 16, 1931 |
| 968,982 | France | Dec. 11, 1950 |